United States Patent
Röttger et al.

(10) Patent No.: US 10,195,684 B2
(45) Date of Patent: Feb. 5, 2019

(54) METHOD OF CONNECTING TWO COMPONENTS

(71) Applicants: ThyssenKrupp Steel Europe AG, Duisburg (DE); ThyssenKrupp AG, Essen (DE)

(72) Inventors: Rolf Peter Röttger, Mulheim/Ruhr (DE); David Pieronek, Dortmund (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 584 days.

(21) Appl. No.: 14/790,286

(22) Filed: Jul. 2, 2015

(65) Prior Publication Data

US 2016/0008915 A1    Jan. 14, 2016

(30) Foreign Application Priority Data

Jul. 8, 2014 (DE) .................. 10 2014 109 523

(51) Int. Cl.
| | |
|---|---|
| *B23K 11/11* | (2006.01) |
| *B21J 15/02* | (2006.01) |
| *B23K 11/34* | (2006.01) |
| *B21J 15/08* | (2006.01) |

(52) U.S. Cl.
CPC ........... *B23K 11/115* (2013.01); *B21J 15/025* (2013.01); *B21J 15/08* (2013.01); *B23K 11/34* (2013.01)

(58) Field of Classification Search
CPC ....... B23K 11/115; B23K 11/34; B21J 15/025
See application file for complete search history.

(56) References Cited

U.S. PATENT DOCUMENTS

| | | | |
|---|---|---|---|
| 6,294,751 | B1 | 9/2001 | Gall |
| 2013/0146574 | A1* | 6/2013 | Birner-Such ............. B23K 9/28 |
| | | | 219/136 |
| 2014/0124484 | A1 | 5/2014 | Burbaum |
| 2015/0174702 | A1* | 6/2015 | Fujimoto ............. B23K 11/115 |
| | | | 428/594 |

FOREIGN PATENT DOCUMENTS

| | | |
|---|---|---|
| CN | 102059439 A | 5/2011 |
| CN | 102581459 A | 7/2012 |
| DE | 10230173 A1 | 1/2004 |
| DE | 102010012830 A1 | 9/2011 |
| DE | 102013011572 A1 | 1/2015 |
| EP | 1072349 A1 | 1/2001 |
| EP | 2561946 A1 | 2/2013 |
| JP | 60-118398 A * | 6/1985 |
| JP | 2010-082666 A * | 4/2010 |
| JP | 2012183543 A | 9/2012 |

OTHER PUBLICATIONS

Machine translation of Japan Patent document No. 2010-082,666-A, Mar. 2018.*

* cited by examiner

*Primary Examiner* — Geoffrey S Evans

(74) *Attorney, Agent, or Firm* — The Webb Law Firm

(57) ABSTRACT

A method of connecting two components (1, 6) is disclosed, wherein a first component (1) is connected to a second component (6) at a connecting point (4) of the first component (1), and wherein a surrounding region (3), which surrounds the connecting point (4), is heated by electrical resistance heating prior to the two components (1, 6) being connected, so that the ductility of the first component (1) in the surrounding region (3) is increased and the strength is substantially reduced.

15 Claims, 1 Drawing Sheet

METHOD OF CONNECTING TWO COMPONENTS

CROSS-REFERENCE TO RELATED APPLICATION

This application claims priority to German Patent Application No. 102014109523.5 filed Jul. 8, 2014, the disclosure of which is hereby incorporated in its entirety by reference.

BACKGROUND OF THE INVENTION

Field of the Invention

The present invention relates to a method of connecting two components, wherein a first component is connected to a second component at a connecting point of the first component.

Description of Related Art

Such methods are used for connecting steel components, for example in automotive construction. EP 2 561 946 A1 describes a method in which a connection between two steel components for a motor vehicle is made by the components being spot welded at a connecting point. Prior to the welding operation, certain regions of one of the two components are heated by a laser beam, and this allows the microstructure of the component to change. This procedure is intended to increase the welding capability by means of spot welding.

The known method has the disadvantage that losses occur as a result of reflection of the laser light on the surface of the component and of non-ideal absorption properties of the material of the component.

SUMMARY OF THE INVENTION

It is an object of the present invention to avoid possible losses as a result of reflection and non-ideal absorption during the operation of heating the component and to arrange the process more straightforward and cost-effective.

In the case of a method of the type mentioned in the introduction, the method is achieved in that a surrounding region, which surrounds the connecting point, is heated by electrical resistance heating prior to the two components being connected, so that the ductility of the first component in the surrounding region is increased and the strength is substantially reduced.

The region around the connecting point, at which the two components are subsequently connected, is heated by resistance heating brought about by an electric current being introduced. This has the advantage that the heat is generated at that location of the component at which the component is intended to be heated. It is not necessary for laser light to be coupled into the component from the outside. There are therefore no losses as a result of reflections on the surface of the component and/or the lack of absorption of photons. It is thus possible for the invention to be integrated in existing systems without high outlay being involved. In addition, laser systems are very expensive to operate.

The heating of the surrounding region respectively increases the ductility and reduces the strength of the first component in the surrounding region. The component becomes softer in the region which surrounds the connecting point, and this improves the stability of the connection between the two components at the connecting point.

A preferred configuration of the method provides that at least one electrode is brought into contact with the surrounding region for electrical resistance heating. An electric current can be introduced directly into the component by the electrode. The electric current can flow through the component in the surrounding region, preferably from a first side of the component to a second side of the component, said second side being located opposite the first side. As an alternative, it is also possible for the at least one electrode to be brought into contact on one side. To this extent, the surrounding region can be heated directly by resistance heating. There is no need for any heat transfer within the component in order for the surrounding region to be heated.

It has proven advantageous in this context if the electrode is part of a set of heating tongs. The heating tongs may be constructed in the manner of a set of joining tongs. The heating tongs may have two electrodes, which are arranged preferably opposite one another, and therefore the surrounding region, which is arranged on the first component, can be accommodated between the two electrodes. An electric current can be directed through the first component by the joining tongs, and therefore the component is heated not just over its surface, but also in the interior.

It is particularly advantageous if the electrode has a contact surface which corresponds to the surface of the surrounding region. The electrode can be brought into full-surface abutment, by way of the contact surface, with the surrounding region of the first component, and therefore the entire surrounding region can be heated in one operation by virtue of a current being introduced from the electrode into the component. There is therefore no need for the electrode to be brought into contact repeatedly with different parts of the surrounding region. If use is made of heating tongs, the area of the contact surface of the electrodes of the heating tongs is preferably larger than that of the contact surface of a set of joining tongs, which are used for connecting the components by resistance spot welding.

It is advantageous if the electrode and/or the heating tongs are/is positioned on the surrounding region by a handling apparatus, in particular a robot, and this therefore does away without the need for manual positioning on the surrounding region of the first component.

A particularly advantageous configuration of the method is one in which the handling apparatus is controlled via a control device, which is fed a set of data with the coordinates of the connecting points. The control device can derive the coordinates of the surrounding regions from the coordinates of the connecting points. There is therefore no need to supply, in addition to the set of data with the connecting points, a further set of data with the coordinates of the surrounding regions. The set of data with connecting points, which is necessary for connecting the first component to the second component, can thus also be used for heating the surrounding regions. It is preferred if the connecting point is arranged in the centre of the surrounding region, and therefore the handling apparatus, for positioning the electrode and/or heating tongs, can be controlled using the coordinates of the connecting points, without any further calculations being necessary.

An advantageous configuration of the method provides that the first component is at least partially hardened prior to being heated, as a result of which the strength of the component is at least partially increased. The first component can be, in particular, at least partially press hardened, wherein the starting material of the first component, for example in sheet-metal form, is heated and then cooled in short measure during a deformation process. The rapid cooling gives rise, at least in part, to a microstructure which has a higher level of hardness. Following the hardening operation, the first component preferably has, at least in part, a tensile strength of at least 1500 MPa.

The tensile strength of the first component in the surrounding region is advantageously reduced to a value of 400 MPa to 900 MPa, preferably to a value of 500 MPa to 800 MPa, particularly preferably to a value of 550 MPa to 700 MPa. For example, the tensile strength in the surrounding region can be set to 600 MPa.

It is preferred if the two components are connected at the connecting point by resistance welding, in particular resistance spot welding. Resistance spot welding can be done using joining tongs, in particular welding tongs. The joining tongs preferably have electrodes of which the contact region is small in relation to the electrodes of the heating tongs. It is optionally possible for at least a third component to be connected to the first and second components at the connecting point. As an alternative, or in addition, it is also possible for the components to be connected at the connecting point by mechanical joining techniques, in particular punch riveting.

It has further proven advantageous if the surrounding region is designed in the form of a flange region. The flange region may be configured, for example, in the form of an essentially planar region of the first component, and this therefore makes it easier for the second component to be placed in position. As an alternative, or in addition, the flange region may be designed in the manner of an angled portion. The flange region may have a plurality of connecting points and a plurality of surrounding regions assigned to the connecting points.

Further details, features and advantages of the invention can be gathered from the drawings, and from the following description of a preferred embodiment with reference to the drawings. The drawings here illustrate merely an exemplary embodiment of the invention, which has no limiting effect on the concept of the invention.

DESCRIPTION OF THE INVENTION

In the various figures, like parts are always provided with like references and it is therefore also usually the case that they are each referred to, or mentioned, only once.

Figure 1:
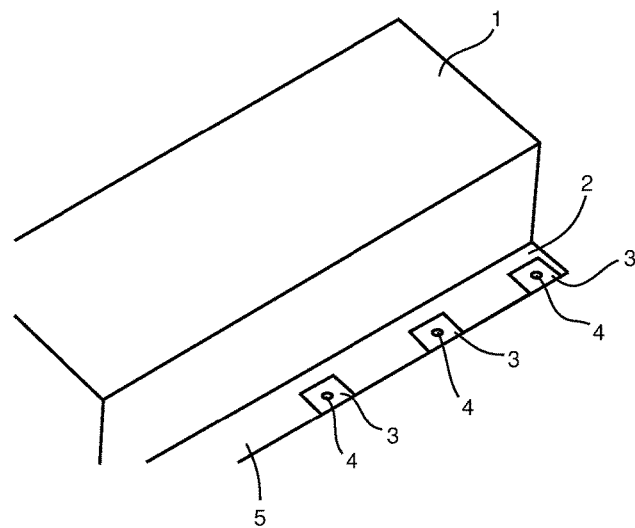
FIG. 1 shows a perspective illustration of a first component.

FIG. 1 illustrates a first component 1, which can be used for example in automotive construction as part of the passenger compartment or of the bodywork or as a bumper or longitudinal support. The first component 1 is a steel component which consists of a high-strength steel material. The first component is at least partially, for example fully, press hardened and has a tensile strength of approximately 1500 MPa.

The first component 1 has a flange region 2, which is designed in the form of an angled, essentially planar region. The operation of connecting the first component 1 to a second component 6 can take place in the flange region 2.

The flange region 2 contains a plurality of connecting points 4, at which the first component 1 is intended to be connected to a second component 6 via weld spots. In order to improve the quality of the weld connection at the connecting points 4, a surrounding region 3, which surrounds the subsequent connecting point 4, is heated prior to the two components 1, 6 being welded. The operation of heating the surrounding region 3 respectively increases the ductility and reduces the strength of the first component 1 in the surrounding region 3. The first component 1 becomes softer in the surrounding region 3. In the case of the first component 1, the tensile strength in the surround region 3 is reduced to a value of approximately 600 MPa. The non-heated, remaining region 5 of the first component 1, even following the heat treatment of the surrounding region 3, has a tensile strength of approximately 1500 MPa.

The surrounding region 3 is heated by electrical resistance heating. This means that an electric heating current is introduced into the surrounding region 3, and this current flows through the surrounding region 3 and, on account of the ohmic resistance of the material of the first component 1, results in the surrounding region 3 being heated. The heating operation as a result of an electric heating current being introduced into the surrounding region 3 has the advantage that the heat is generated at that location of the first component 1 at which the first component 1 is intended to be heated.

Figure 2:
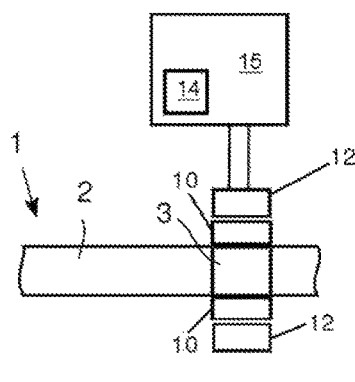
FIG. 2 shows a sectional illustration of a flange region of the first component during the operation of the first component being heated by an embodiment of the method according to the invention.

An embodiment of the method according to the invention will be explained hereinbelow with reference to the illustration in FIG. 2. Prior to the first component 1 being welded to the second component 6, a set of heating tongs 12 is brought into contact with the first component 1 in the surrounding region 3. The heating tongs 12 have two electrodes 10, which are brought into abutment with the respective surface of the surrounding region 3 on opposite sides of the first component 1. To this extent, the heating tongs 12 achieve surface contact with the first component 1, on either side thereof, in the surrounding region 3. The electrodes 10 have a contact surface which is intended for coming into contact with the first component 1 and of which the dimensions correspond essentially to the dimensions of the surrounding region 3.

The heating tongs 12 are arranged on a first handling apparatus 15, which can move the heating tongs 12. The first handling apparatus 15 is designed in the form of a robot. The movement of the heating tongs 12 can be controlled via a first control device 14, which is connected to the first handling apparatus 15. The first control device 14 can be programmed, and therefore it can be fed a set of data with reference to which the first control device 14 controls the first handling apparatus 15 such that the heating tongs 12 are positioned at a predetermined position.

Figure 3:
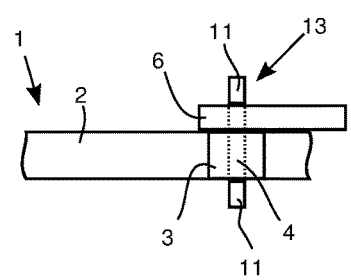
FIG. 3 shows a sectional illustration of the flange region according to FIG. 2 during the operation of the first component being welded to a second component.

As can be gathered from the illustration in FIG. 3, once the surrounding region 3 has been heated, the first component 1 is spot welded to the second component 6 at the connecting point 4. The second component 6 is placed in position on one side of the flange region 2 of the first component 1. In a further step, a set of welding tongs 13 with two mutually opposite electrodes 11 is advanced up to the connecting point such that the two components 1, 6 are arranged between the electrodes 11. The electrodes 11 then come into contact with the components 1, 6 and introduce a welding current into the two components 1, 6, said welding current being larger than the heating current used for heating purposes. At the same time, the electrodes 11 apply a predetermined pressure to the two components 1, 6, the components 1, 6 being pressed against one another.

The welding tongs 13 are moved by a second handling apparatus. The second handling apparatus is likewise designed in the form of a robot. A second control device is connected to the second handling apparatus, and said second control device controls the movement of the second handling apparatus and thus the movement of the welding tongs 13. The second control device can be programmed, and therefore it can be fed a set of data which contains the coordinates of the connecting points 4 and with reference to which the second control device controls the second handling apparatus such that the welding tongs 13 are positioned at a predetermined position, in particular a connecting point 4.

According to a modification of the exemplary embodiment, the first control device 14 and the second control device are fed the same set of data with the coordinates of the connecting points 4. There is therefore no need to supply, in addition to the set of data with the connecting points 4, a further set of data with the coordinates of the surrounding regions 3.

A further modification of the exemplary embodiment provides for the first and the second handling apparatuses to be controlled via a joint control device, and therefore the same control device controls both the heating tongs 12 and the welding tongs 13.

In the case of the above described method of connecting two components 1, 6, wherein a first component 1 is connected to a second component 6 at a connecting point 4 of the first component 1, a surrounding region 3, which surrounds the connecting point 4, is heated by electrical resistance heating prior to the two components 1, 6 being connected, so that the ductility of the first component 1 in the surrounding region 3 is increased and the strength is substantially reduced. Alongside the integral connection referred to in the exemplary embodiments, it is also possible for mechanical joining techniques, in particular punch riveting, to be used for connecting components.

LIST OF DESIGNATIONS

1 First component
2 Flange region
3 Surrounding region
4 Connecting point
5 Remaining region
6 Second component
10 Electrode
11 Electrode
12 (Set of) heating tongs
13 (Set of) welding tongs

The invention claimed is:

1. Method of connecting two components, comprising:
    heating, by electrical resistance heating, a surrounding region of a first component which surrounds a connecting point of the first component so that the ductility of the first component in the surrounding region is increased and the strength is substantially reduced;
    positioning a second component on the first component after heating the surrounding region of the first component; and
    connecting the first component to the second component at the connecting point of the first component.

2. Method according to claim 1, wherein at least one electrode is brought into contact with the surrounding region for electrical resistance heating.

3. Method according to claim 2, wherein the electrode has a contact surface which corresponds to the surface of the surrounding region.

4. Method according to claim 2, wherein the electrode is part of a set of heating tongs.

5. Method according to claim 4, wherein the electrode and/or the heating tongs are/is positioned on the surrounding region by a handling apparatus.

6. Method according to claim 5, wherein the handling apparatus is controlled via a control device, which is fed a set of data with the coordinates of the connecting points.

7. Method according to claim 5, wherein the handling apparatus is a robot.

8. Method according to claim 1, wherein the first component is at least partially hardened prior to being heated.

9. Method according to claim 8, wherein the first component is at least partially press hardened prior to being heated.

10. Method according to claim 1, wherein the tensile strength of the first component in the surrounding region is reduced to a value of 400 MPa to 900 MPa.

11. Method according to claim 1, wherein the first component and the second component are connected at the connecting point by resistance welding and/or by a mechanical joining technique.

12. Method according to claim 11, wherein the resistance welding comprises spot resistance welding.

13. Method according to claim 1, wherein the surrounding region is in the form of a flange region.

14. Method according to claim 1, wherein the tensile strength of the first component in the surrounding region is reduced to a value of 500 MPa to 800 MPa.

15. Method according to claim 1, wherein the tensile strength of the first component in the surrounding region is reduced to a value of 550 MPa to 700 MPa.

* * * * *